R. A. WEAGANT.
WIRELESS SIGNALING APPARATUS.
APPLICATION FILED APR. 5, 1915. RENEWED JAN. 13, 1916.
1,290,438.
Patented Jan. 7, 1919.
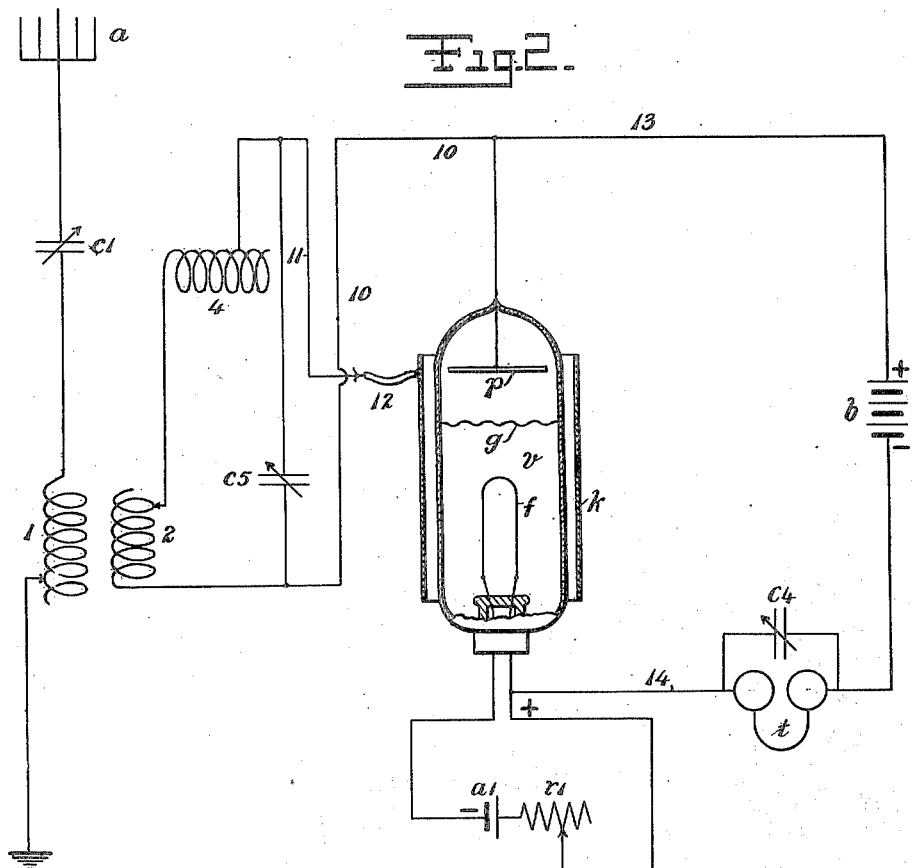
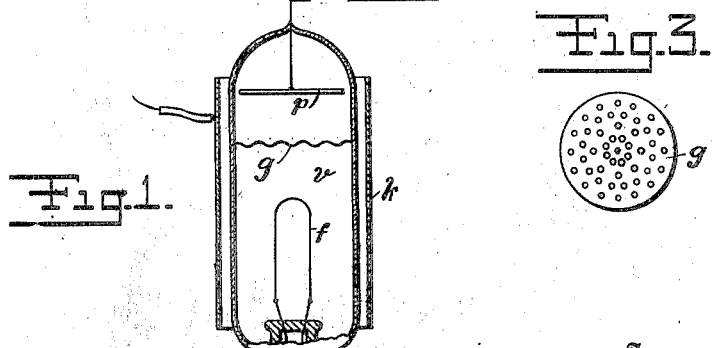

UNITED STATES PATENT OFFICE.

ROY A. WEAGANT, OF ROSELLE, NEW JERSEY, ASSIGNOR TO MARCONI WIRELESS TELEGRAPH COMPANY OF AMERICA, OF NEW YORK, N. Y., A CORPORATION OF NEW JERSEY.

WIRELESS SIGNALING APPARATUS.

1,290,438.  Specification of Letters Patent.  Patented Jan. 7, 1919.

Application filed April 5, 1915, Serial No. 19,185. Renewed January 13, 1916. Serial No. 71,996.

*To all whom it may concern:*

Be it known that I, ROY A. WEAGANT, a citizen of the United States, and a resident of Roselle, county of Union, State of New Jersey, have made certain new and useful Improvements in Wireless Signaling Apparatus, of which the following is a specification.

This invention relates to apparatus for use in radio communication and its object is to provide an improved means for the detection of electrical impulses or variations.

The invention is an improvement on the well-known Fleming vacuum valve shown and described in U. S. Letters Patent No. 803684, November 7th, 1905. In the improved apparatus shown and described herein there is employed a vacuum chamber, a hot electrode and a cold electrode with an intervening electrically disconnected element of conducting material in position between said electrodes and there is an electrode having an extended area located in position outside said chamber with its surface approximately parallel to the direct line of electron movement. A local circuit has its terminals connected with one of the electrodes within the chamber and the electrode outside the chamber, said circuit including an inductance, a capacity and means associating said circuit with the antenna. The telephone or indicating instrument is in a battery circuit having its terminals connected to the two electrodes within the chamber. The two circuits are electrically connected, or electrically associated by suitable means.

In the adjustment and operation of the valve it is found that a certain adjustment of the voltage of the battery in the circuit of the indicating apparatus gives a maximum effect. When the hot electrode and the cold electrode are a comparatively short distance apart, the device is most sensitive, but the potential of the battery which gives the best adjustment is then low and the responses are comparatively weak; when the spacing between the hot and cold electrodes is increased, the potential of the battery necessary to give maximum effect is greater and the responses are greater, but the sensitiveness, that is, the ability to respond to weak impulses is reduced. When, however, we introduce an element of conducting material between the hot and cold electrodes we find that although this electrode has no external connections, we are able to use the short spacing referred to between electrodes, with consequent greater sensitiveness combined with the higher battery potential and consequently get increased intensity of response, thus combining the advantages of opposing conditions previously described.

In the drawings, Figure 1 shows a vacuum valve having an electrically disconnected element intermediate the inclosed electrodes; Fig. 2 shows such a valve, connected into two associated local circuits as a detector; Fig. 3 is a detail of a desirable form of grid element.

The vacuum chamber Fig. 2 has a hot element $f$ and a cold element $p$; the hot element is supplied with heat by an adjustable battery $a^1$, in series with a rheostat $r^1$ and the filament $f$.

In the vacuum chamber $v$, mechanically supported in any suitable manner, is a grid $g$. This is in effect a partition or obstruction of woven wire or as shown in Fig. 3, a closely perforated plate, supported as shown in Figs. 1 and 2 upon the inside of the glass wall of the vacuum chamber. It is disconnected, that is to say, it has no external electrical connections. There is an external electrode having extended area such as a cylinder of copper $k$, fixed parallel with the direct line of electron movement, the path of which is from the hot element $f$ to the cold element $p$ in a practically direct line except as influenced by the presence of the partition $g$. The two local circuits employed are electrically associated or connected by uniting the terminals 10 and 13 at the junction with plate electrode $p$.

In the antenna circuit, $a$, is a capacity, $c^1$, and an inductance 1. This inductance 1 also functions as the primary of an inductance coil, the secondary 2 of which is in a local closed oscillating circuit in series with a section of inductance 4, both coils 2 and 4 being bridged by an adjustable capacity $c^5$. The circuit terminal 11 is connected to the lead 12, which is soldered to the exterior electrode $k$ and the terminal 10 of said circuit is connected to the plate electrode $p$, that is, the cold electrode. The second local circuit has its terminal 13 connected to plate $p$ and therefore to the first named circuit, the second terminal 14 is connected to the hot element $f$. In series in said circuit is a variable battery or source of direct current $b$ and a receiving telephone $t$, with a variable capacity $c^4$, in parallel with the telephone.

As before stated, the element $k$ appears to act directly upon the electron stream and is the essential element in impressing upon that stream variations corresponding to the received signals whether these be damped or undamped oscillations. It is therefore desirable that the element $k$ should be as intimately associated with said stream as possible but otherwise its particular form is immaterial. I find that giving it an extended surface parallel to the general axis or direct line of electron flow is an apparently desirable relation. The construction of the tube with a small diameter is a means aiding in bringing about the required intimacy of relation.

It will be noted that the element $k$ as shown in Fig. 2 of the drawings is located at the high potential point of the secondary receiving circuit. This is a desirable arrangement for obtaining maximum sensitiveness.

The interrupting means $g$, as also above stated, is a means of favorably affecting the electrostatic gradient between $f$ and $p$, so as to permit the use of an advantageous spacing and a high battery voltage, such a voltage permitting higher energy in the amplified signal.

In an application of even date herewith, Serial No. 19,184, I have described a Fleming oscillation valve as a source of oscillations of high frequency for any purpose, i. e. not only for reception of signals as herein described, but also other uses, such as transmission. I intend to cover such uses of the improvement herein described, as will appear from the scope of the claims made.

What I claim is:

1. In a vacuum valve the combination of an exhausted chamber, a hot electrode and a cold electrode in the chamber, means for establishing an electron flow between said electrodes, a perforated metal screen in position in the vacuum chamber between said electrodes and an exterior electrode having an extended surface.

2. In a vacuum valve the combination of an exhausted chamber, a hot electrode and a cold electrode within said chamber, means for establishing an electron flow between said electrodes, a convoluted wire or strip in position between said electrodes and an exterior electrode having an extended surface.

3. In a wireless communicating apparatus, the combination of a vacuum valve having an exhausted chamber, a hot electrode, a cold electrode and an intervening element of conducting material in position between said electrodes, means for establishing an electron flow between said electrodes, and an electrode outside the chamber having extended area.

4. In a wireless signaling apparatus, the combination, with an antenna, of a vacuum chamber, a hot electrode and a cold electrode in said chamber, an intervening element of conducting material in position between said electrodes and an electrode having extended area, located in position outside said chamber with its surface approximately parallel to the direct line of electron movement and a local circuit having its terminals connected with one electrode within the chamber and the electrode outside the chamber, said circuit including an inductance, a capacity and means associating said circuit with the antenna.

5. In a wireless signaling apparatus, the combination of an antenna, a vacuum chamber, a hot electrode and a cold electrode in said chamber, an intervening element of conducting material in position between said electrodes and an electrode having extended area located in position outside said chamber with its surface approximately parallel to the direct line of electron movement, a local circuit having its terminals connected with said hot and cold elements, respectively, and including a battery and an indicating instrument.

6. In a device of the kind described, a vacuum chamber, a plurality of electrodes sealed therein, means for establishing an electron flow between two of the electrodes, means for intercepting the electron flow and an electrode located externally to the chamber for influencing the electron flow in response to received signals.

7. In a device of the kind described, a vacuum chamber, a plurality of electrodes inclosed therein, means for establishing an electron flow between two of the electrodes, intercepting means located at right angles to the direct line of electron flow, and an electrode for influencing the electron flow and located parallel thereto.

8. In a device of the kind described, a plurality of electrodes, means for establishing an electron flow therebetween, means for influencing the electrostatic gradient between the electrodes and an electrode for affecting the electron flow in response to received oscillations.

9. In a device of the kind described, a closed chamber containing a plurality of electrodes, means for establishing an electron flow therebetween, means within the chamber for influencing the electrostatic gradient between the electrodes and an electrode wholly without the chamber for affecting the electron flow in response to received oscillations.

ROY A. WEAGANT.